(No Model.)

H. MYERS.
WHEEL TIRE.

No. 502,741. Patented Aug. 8, 1893.

Witnesses:
Philip Ungewiss.
A. H. Moon.

Inventor:
Henry Myers
By Hermann Bornemann
atty

UNITED STATES PATENT OFFICE.

HENRY MYERS, OF PHILADELPHIA, PENNSYLVANIA.

WHEEL-TIRE.

SPECIFICATION forming part of Letters Patent No. 502,741, dated August 8, 1893.

Application filed July 7, 1892. Serial No. 439,236. (No model.)

*To all whom it may concern:*

Be it known that I, HENRY MYERS, a citizen of the United States, residing at Philadelphia, in the county of Philadelphia and State of Pennsylvania, have invented certain new and useful Improvements in Wheel-Tires, of which the following is a specification.

The object of my invention is to provide a simple and efficient inflatable wheel tire formed of a flat endless sheet of rubber and held in a metal or other wheel tire by projections or spurs engaging metal rings, placed in the annular groove of said metal tire.

My invention will be more fully understood taken in connection with the accompanying drawings forming part hereof and in which—

Figure 1:
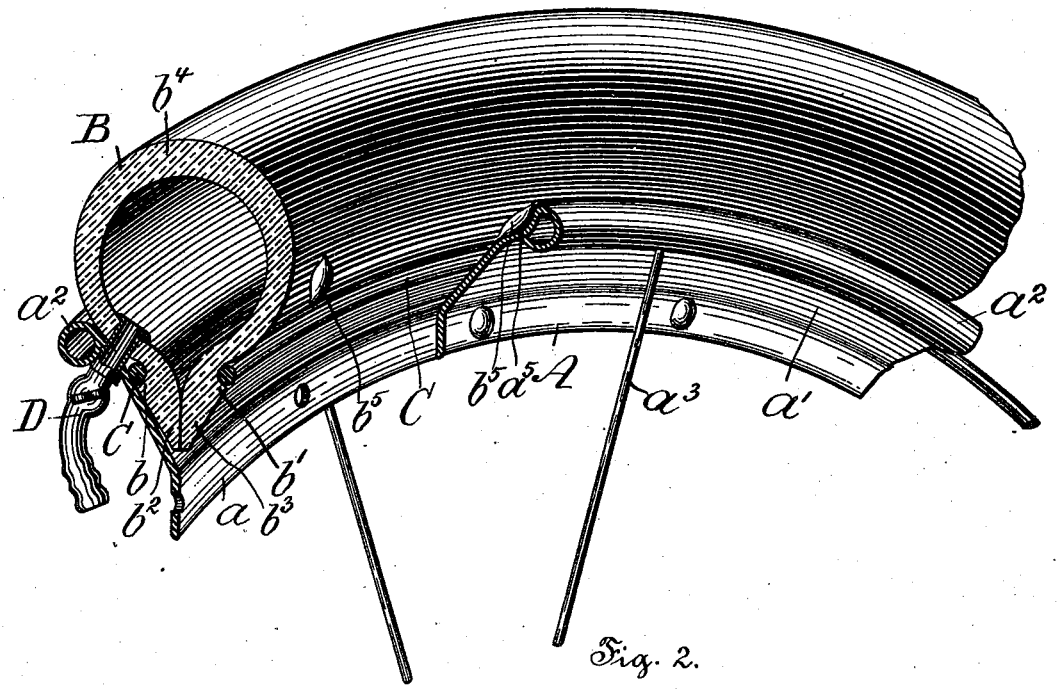
Figure 2:
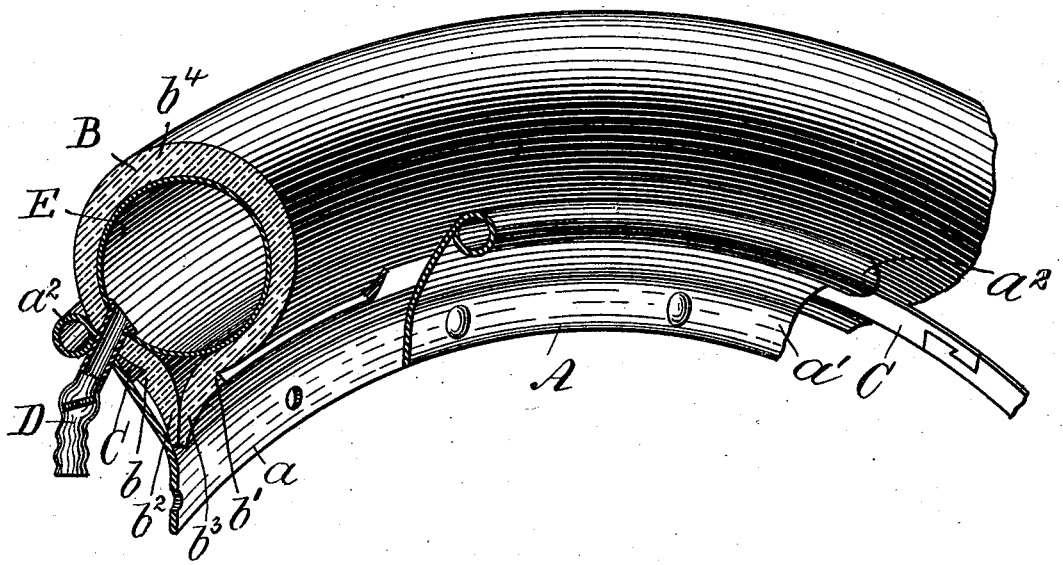

Figure 1 is a cross section and a part shown in elevation of a wheel tire made in accordance with my invention and showing wire rings for holding the inflatable tire in position in the metal tire; and Fig. 2 is a similar view but showing the inflatable tire retaining rings, of a triangular cross section, composed of sections.

In the drawings, A is the metal tire made in two annular sections $a$ and $a'$ riveted or otherwise held together to form a V shaped annular cavity of the tire and each section $a$ and $a'$ is provided with a rounded off edge $a^2$ to provide a broad bearing surface for the inflatable tire B, and a convenient support for the spokes $a^3$. The tire B is made of a flat sheet of elastic material and is provided with annular spurs or projections $b$ and $b'$ near its wedge shaped edges $b^2$ and $b^3$.

C are rings made continuous and round in cross-section as shown in Fig. 1 or discontinuous and the sections joined together in any preferred manner and of a triangular or other cross-section as shown in Fig. 2. If the rings C be made continuous as in Fig. 1 they must be placed in the annular V shaped cavity of the tire A before the sections are fastened together as they are of a smaller diameter than the tire A. These rings C are for the purpose of holding the flat elastic sheet in the V shaped cavity of the metal tire, to constitute a safe and air tight inflatable wheel tire; the spurs $b$ and $b'$ are each caused to engage one of the rings C, whereby the wedge shaped edges $b^2$ and $b^3$ are forced together and form an air tight joint. The tendency of the inflatable tire to return to its original flat shape also forces the annular portions of the inflatable tire into contact with the upper edges of the V shaped metal tire A, so that the real seat or bearing portion of the tire is at the edges $a^2$ of the tire A.

D is the usual nozzle and cock for admitting air or other gaseous or liquid bodies for inflating into the elastic tire B. It may here be stated that the higher the pressure is in the flexible tube the tighter the wedge shaped edges $b^2$ and $b^3$ will be forced together and prevent leakage. Should the thread portion $b^4$ which is made thicker than the remaining portions of the tire B become cut or mutilated, the tire B may be very readily disengaged from the metal felly A at the particular part desired, by simply unhooking the spurs or projections from one or both of the rings C. If it is desired to further insure the air tightness of the tire B an inner tubing E of very elastic material may be mounted within the tire B and be brought in communication with the nozzle D, so that instead of inflating the elastic tire B directly the tubing E is inflated and lies close to the walls of the tire B giving it the desired shape, as is shown in Fig. 2. A secondary nozzle D may be placed on the tire A similar to the one shown in Fig. 1 and the tubing E with its nozzle D still be retained. In such case the tubing E is not to be inflated unless it should become necessary by the tire B being cut or otherwise becoming leaky. To prevent slipping of the tire B on its felly A the tire B may be corrugated or provided with projections $b^5$ which engage suitable cavities $a^5$ in the metal tire or felly A.

The wedge shaped edges $b^2$ and $b^3$ may be protected from being easily abraded by placing cotton or other analogous soft material in the V shaped cavity.

Having thus described the nature and object of my invention, what I claim as new, and desire to secure by Letters Patent, is—

1. A wheel tire comprising a metal felly made in two annular sections and forming a V shaped annular groove, two loose rings within said groove, and an elastic tire held within said groove and by the said rings substantially as and for the purposes set forth.

2. A wheel tire comprising a metal felly made in two annular sections and forming a V shaped annular groove, two rings within said groove, and an inflatable tire formed of a flat endless sheet of elastic material held within said groove and by the said rings substantially as and for the purposes set forth.

3. A wheel tire comprising a metal felly having an annular groove, two rings within said groove, and an inflatable tire formed of a flat endless sheet of elastic material, held within said groove and by the said rings, substantially as and for the purposes set forth.

4. A wheel tire comprising a metal felly having an annular cavity two rings within said cavity an inflatable tire formed of an endless sheet of elastic material held in the said cavity by the said two rings and against longitudinal displacement by corrugations substantially as and for the purposes set forth.

5. A wheel tire comprising a metal felly having an annular groove, two rings within said groove an inflatable tire formed of an endless sheet of elastic material and having an inner tubing said inflatable tire held in the said groove by two rings and against longitudinal displacement by corrugations substantially as and for the purposes set forth.

In witness whereof I have hereunto set my signature in the presence of two subscribing witnesses.

HENRY MYERS.

Witnesses:
FREDERICK P. WIKOFF,
HERMANN BORMANN.